United States Patent [19]
Jostlein

[11] Patent Number: 5,315,259
[45] Date of Patent: May 24, 1994

[54] OMNIDIRECTIONAL CAPACITIVE PROBE FOR GAUGE OF HAVING A SENSING TIP FORMED AS A SUBSTANTIALLY COMPLETE SPHERE

[75] Inventor: Hans Jostlein, Naperville, Ill.

[73] Assignee: Universities Research Association, Inc., Washington, D.C.

[21] Appl. No.: 889,060

[22] Filed: May 26, 1992

[51] Int. Cl.⁵ .......................................... G01R 27/26
[52] U.S. Cl. .................... 324/690; 324/662; 324/686
[58] Field of Search .......... 324/658, 661, 662, 681, 324/686, 690

[56] References Cited

U.S. PATENT DOCUMENTS

| | | | |
|---|---|---|---|
| 2,842,738 | 7/1958 | Warnick | 324/690 |
| 2,935,681 | 5/1960 | Anderson | 324/690 X |
| 3,452,273 | 6/1969 | Foster | 324/662 |
| 3,706,919 | 12/1972 | Abbe | 361/280 |
| 3,815,020 | 6/1974 | Mayer | 324/662 |
| 4,067,225 | 1/1978 | Dorman et al. | 73/1 DV |
| 4,422,035 | 12/1983 | Risko | |
| 4,482,860 | 11/1984 | Risko | |
| 4,688,141 | 8/1987 | Bernard et al. | 324/662 X |
| 4,695,789 | 9/1987 | Lambertz et al. | 324/690 |
| 4,766,389 | 8/1988 | Rhoades et al. | |
| 4,816,744 | 3/1989 | Papurt et al. | 324/661 X |
| 4,908,574 | 3/1990 | Rhoades et al. | 324/675 |
| 4,918,376 | 4/1990 | Poduje et al. | 324/663 |
| 4,924,172 | 5/1990 | Holmgren | 324/664 |
| 5,189,377 | 2/1993 | Rhoades et al. | 324/662 |

FOREIGN PATENT DOCUMENTS 0169301  7/1989  Japan ................................ 324/690

OTHER PUBLICATIONS

Dean Campbell, Noncontact test and inspection, Jul. 1986, pp. 57–60.
Robert C. Abbe, A Brief Report on Non-Contact Gauging, Jun. 1975, pp. 16–20.
B. H. Knowles, Capacitance gauging: Survey of Recent Advances, Oct. 1988, pp. 14–22.
David J. McRae, Using Capacitive Sensing for Non-contact Dimensional Gauging, Oct. 1988, pp. 13–20.
Technical literature for an "OMNISIP" Probe as manufactured by American SIP Corporation, Nov., 1988, pp. 1–5.

*Primary Examiner*—Kenneth A. Wieder
*Assistant Examiner*—Glenn W. Brown
*Attorney, Agent, or Firm*—McAndrews, Held & Malloy, Ltd.

[57] ABSTRACT

A non-contact, omni-directional capacitive probe for use in dimensional gauging includes an electrically conductive spherical sensing tip that forms a capacitor with a workpiece, the capacitance of the capacitor being indicative of the distance between the spherical sensing tip and the workpiece.

6 Claims, 7 Drawing Sheets

OMNIDIRECTIONAL CAPACITIVE PROBE FOR GAUGE OF HAVING A SENSING TIP FORMED AS A SUBSTANTIALLY COMPLETE SPHERE

This invention was made with Government support under Contract No. DE-AC02-76CH03000, awarded by the United States Department of Energy. The Government has certain rights in the invention.

BACKGROUND OF THE INVENTION

The present invention is directed to a capacitive probe for use in dimensional gauging. More specifically, the invention is directed to a non-contact, omni-directional probe for use with a coordinate measurement machine (CMM).

Computerized CMMs have become standard equipment in machine shops, QA laboratories, and precision engineering labs. The CMMs guide a sensing probe in a coordinate measurement system to obtain dimensional information from a workpiece.

Several different sensor probe types are available. In systems with mechanical contact type sensor probes, the sensor probe is guided into contact with the workpiece until a switch in the probe is opened or closed. The CMM computer acquires the dimensional information upon activation of the switch.

Such mechanical contact probes have several disadvantages. Mechanical contact probe typically require contact forces in excess of a tenth of a newton thus rendering them useless in, for example, gauging silicon structures which cannot be touched in a non-destructive manner.

Non-contact probes may be used in lieu of the mechanical contact probes described above. One type of non-contact probe is described in McRae, "Using Capacitive Sensing for Noncontact Dimensional Gauging", Sensors, pp. 13–20, October 1988. The article describes the use of a flat plate sensor that forms a parallel plate capacitor when placed adjacent a conductive target plate (e.g. workpiece). The capacitance of the parallel plate capacitor is inversely proportional to the distance between the sensor and the target plate. Thus, $C = K/d$ where C is the capacitance, K is a constant, and d is the distance between the sensor and target plate.

Parallel plate capacitive probes have several disadvantages. They must be precisely aligned in parallel with the target plate so that the capacitive plate area remains relatively constant. Additionally, the unidirectional character of the parallel plate capacitance only allows positional measurement along a single coordinate axis that is normal to the flat probe plate.

It is therefore an object of the present invention to provide a non-contact, omni-directional capacitive probe for use in dimensional gauging.

SUMMARY OF THE INVENTION

The present invention is directed to a non-contact, omni-directional probe for dimensional gauging. The probe includes an electrically conductive spherical sensing tip that forms a capacitor with a target workpiece. The spherical sensing tip is mounted at one end of a hollow, conductive stalk and is insulated therefrom. A conductive wire is coaxially disposed through the center of the hollow stalk and is connected to the spherical sensing tip. The stalk and coaxial wire are each connected to receive an A.C. voltage from a respective A.C. source. The A.C. voltages are generally in phase with one another and have generally equal amplitudes to reduce the effects of stray capacitance on the probe measurements.

BRIEF DESCRIPTION OF THE DRAWINGS

Other objects, features and advantages of the present invention will become apparent upon review of the description of the preferred embodiments taken in conjunction with the following drawings, on which.

DESCRIPTION OF THE PREFERRED EMBODIMENT

Figure 1:
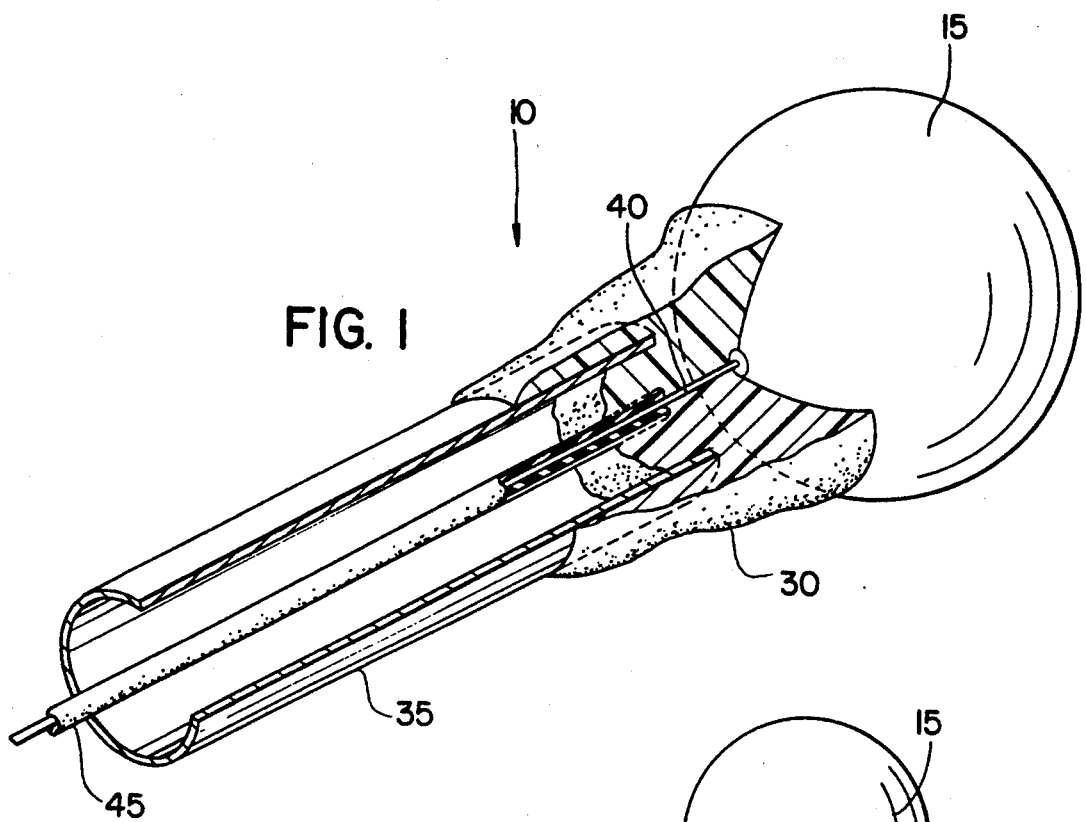
FIG. 1 is a partial cross-sectional view of a capacitive probe constructed in accordance with one embodiment of the invention.

Referring to FIG. 1, there is shown a capacitive probe 10. The probe 10 includes a spherical sensing tip 15 that may be constructed as a single unitary structure from, for example, steel, tungsten carbide, Inconel, or another hard conductive material which resists chipping and deformation. The diameter of the spherical tip 15 is dependent on the particular application of the probe. The radius of the spherical tip 15 should be much greater than the distance that is to be sensed between the tip and a target plate. For present purposes, however, the probe 10 and the corresponding test results will be described with respect to a 4.78 mm diameter spherical tip 15 made from steel.

Figure 2:
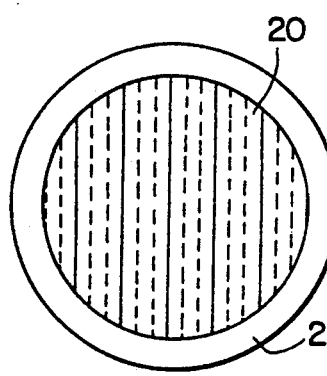
FIG. 2 is a cross-sectional view of a spherical sensing tip constructed in accordance with a further embodiment of the invention.

The spherical sensing tip 15 can also be formed as shown in FIG. 2. As illustrated the spherical tip 15 has a central portion 20 formed, for example, from an insulating material such as a ceramic. An outer conductive shell 25 is disposed about the periphery of the central portion 20.

Referring once again to FIG. 1, an insulating neck 30 connects the spherical tip 15 to one end of a hollow stalk 35. The neck 30 may be formed, for example, from an epoxy material that insulates the tip 15 from the hollow stalk 35 and provides a sturdy mechanical connection therebetween. The stalk 35 may be formed, for example, from brass or stainless steel.

A wire 40 is coaxially disposed within the hollow stalk 35 and extends into electrical contact with the spherical tip 15. The wire 40 may include an insulating sheath 45 to ensure that the hollow stalk 35 and wire 40 do not make electrical contact with one another. Alternatively, no insulating sheath need be employed.

Figure 2A:
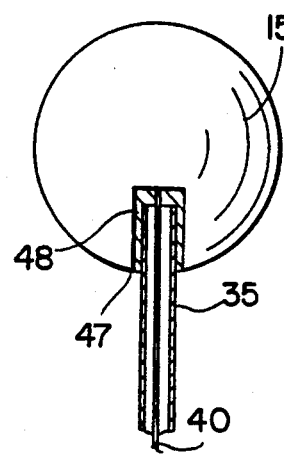
FIG. 2A is a partial cross-sectional view of a further embodiment of the spherical probe tip.

An alternative construction of the spherical tip 15 and the hollow stalk 35 is shown in FIG. 2A. As illustrated, the spherical tip 15 has an aperture 47 that receives the hollow stalk 35. An insulating material 48, such as an epoxy, is disposed within the aperture 47 to mechanically connect and electrically insulate the tip 15 from the stalk 35.

It will be recognized by those skilled in the art that the stalk 35 is hollow to accommodate the wire 40 and reduce the effect of stray capacitance. However, the stalk need not be hollow if an alternative path for wire 40 is used or if an alternative method of reducing the effect of stray capacitance is employed.

Figure 3:
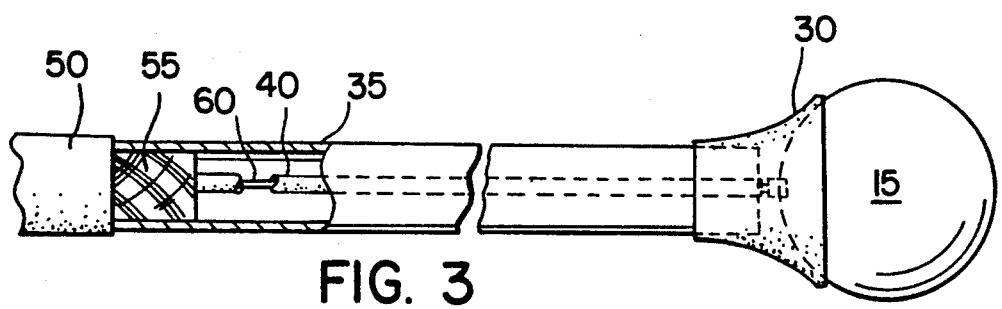
FIG. 3 is a further partial cross-sectional view of the capacitive probe of FIG. 1.

As illustrated in FIG. 3, the probe 10 is connected to a coaxial cable 50, such as RG-179 cable. The coaxial cable 50 includes an outer conductor 55 that is electrically connected to the stalk 35 and an inner conductor 60 that is electrically connected to the coaxially disposed wire 40. Although the probe 10 is illustrated with a direct mechanical connection between the coaxial cable 50 and the rest of the probe assembly, those of ordinary skill in the art will recognize that the connection may be facilitated by a coaxial cable connector.

Figure 4:
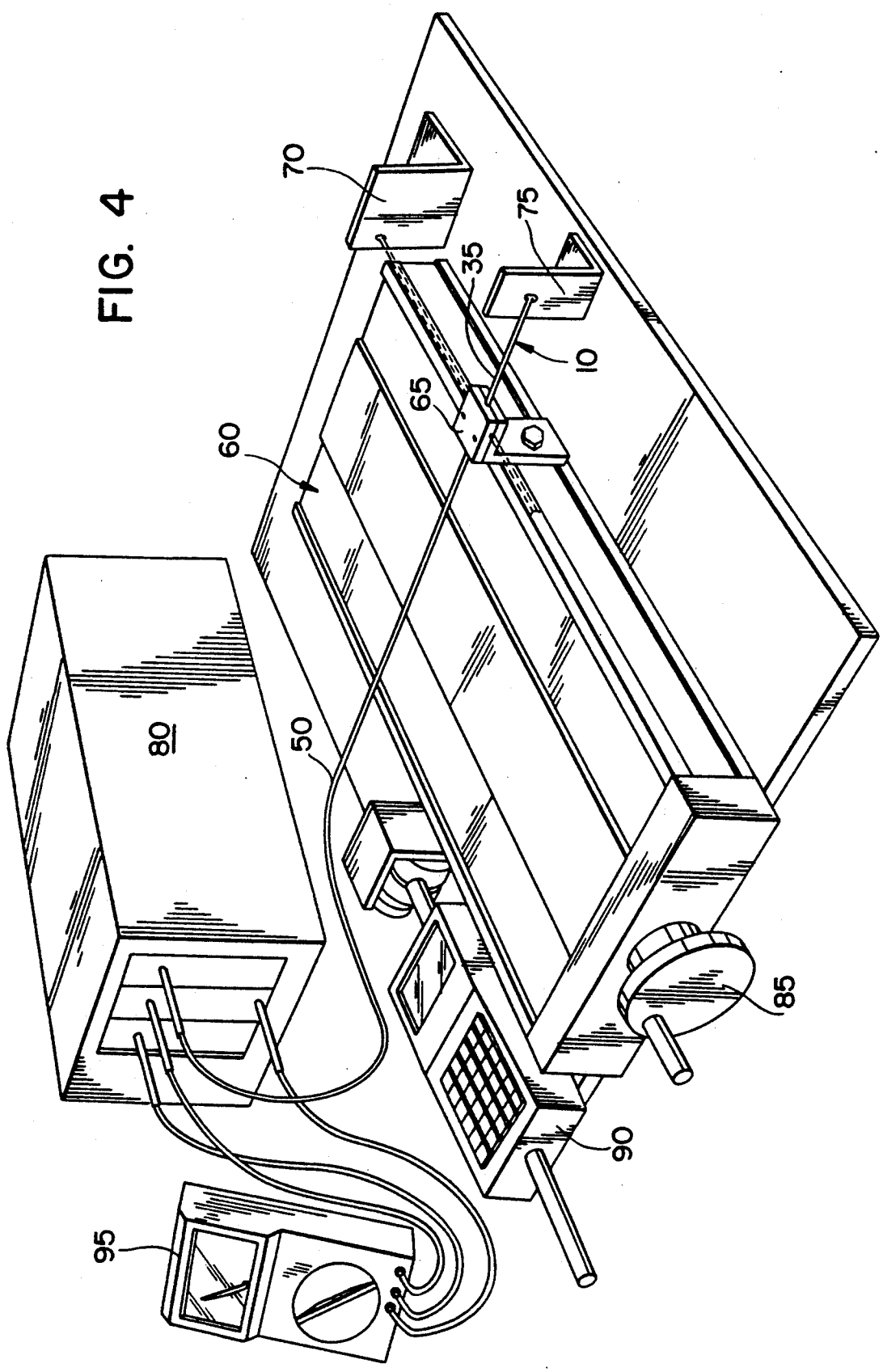
FIG. 4 is a perspective view of an apparatus for testing and calibrating the capacitive probe of FIG. 1.

FIG. 4 illustrates an apparatus for calibrating and testing the probe 10. The apparatus includes a slider table 60 having an insulating vise 65 for gripping the stalk 35 of the probe and orienting the probe 10 in either of at least two directions. Two target plates 70 and 75 are also provided and represent a workpiece that is to be sensed. Target plate 70 is used for calibrating and testing the probe 10 with the stalk 35 normal to the target plate as shown in phantom. Target plate 75 is used for calibrating and testing the probe 10 with the stalk 35 generally parallel with the target plate.

The target plates 70 and 75 are formed from aluminum, a conductive metal. However, the probe 10 can be used with other conductive materials. The conductivity of the material need not be significant. Materials with several megohms/square can be gauged.

The probe 10 is driven with a capacitive probe driver 80, such as a Capacitec Model 4100S driver with a 4100-C clock unit available from Capacitec Corp., P.O. Box 819, 87 Fitchburg Road, Ayer, Mass., 01432. The probe driver 80 includes two separate, electrically isolated A.C. voltage outputs. A first output is connected to the inner conductor 60 of coaxial cable 50 and therefrom to wire 40 running through the hollow stalk 35 and is used to generate a first A.C. voltage potential between the spherical sensing tip 15 and the target plate. A second output is connected to the outer conductor 55 of coaxial cable 50 and therefrom to the hollow stalk 35 and is used to generate a second A.C. voltage potential between the hollow stalk 35 and the target plate. The first and second voltage potentials are generally equal in magnitude and are generally of the same phase so as to eliminate the effect of stray capacitance on probe measurements.

The position of the spherical sensing tip 15 relative to the respective target 70 or 75 is adjusted with an adjustment handle 85. The respective target and probe tip 15 are brought into contact with one another, at which point a displacement meter 90 is zeroed. The displacement meter 90 is then used to measure the displacement of the probe tip 15 from the respective target plate. A Mitutoyo Digimatic Indicator Model IDF 130-E may be used for this purpose.

The current flowing between the spherical sensing tip 15 and the target plate is a function of the capacitance of a capacitor formed by these structures. The probe driver 80 measures the A.C. current flowing between the spherical sensing tip 15 and the target plate and supplies a D.C. voltage output representative of the current and, thus, the capacitance. The D.C. voltage output is measured, for example, with a voltmeter 95 and is used in conjunction with the displacement meter 90 to test and calibrate the probe 10.

Figure 5:
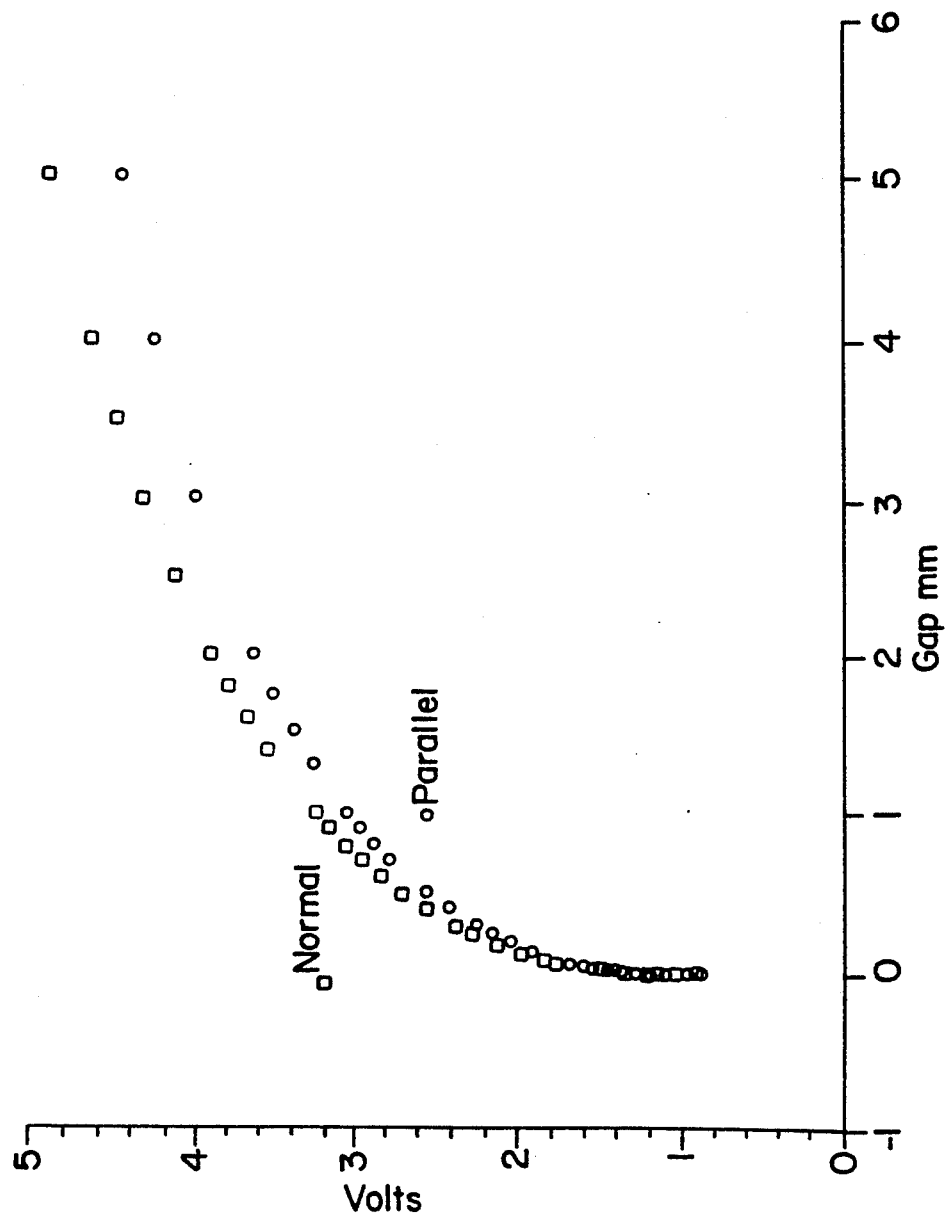
FIG. 5 is a graph showing test data for two stalk orientations obtained using the apparatus of FIG. 4.

Test measurements were taken with the apparatus shown in FIG. 4. FIG. 5 is a linear graph of the DC voltage output of the capacitive probe driver 80 as a function of the gap between the probe tip 15 and the respective target plate. The graph shows two functions, one in which the stalk 35 is normal to the target plate 70 and one in which the stalk 35 is generally parallel to the target plate 75. Thus, the test measured two extreme stalk orientations.

The graph of FIG. 5 shows the D.C. voltage output of the probe driver 80 for gap sizes between 0 and 6 mm. As illustrated, graphs for the two stalk orientations diverge for larger gaps, but tend to converge for smaller gaps. The capacitance and, thus, the output voltage, exhibits a logarithmic relationship with ga size. This logarithmic relationship is further shown in FIG. 5A.

Figure 6:
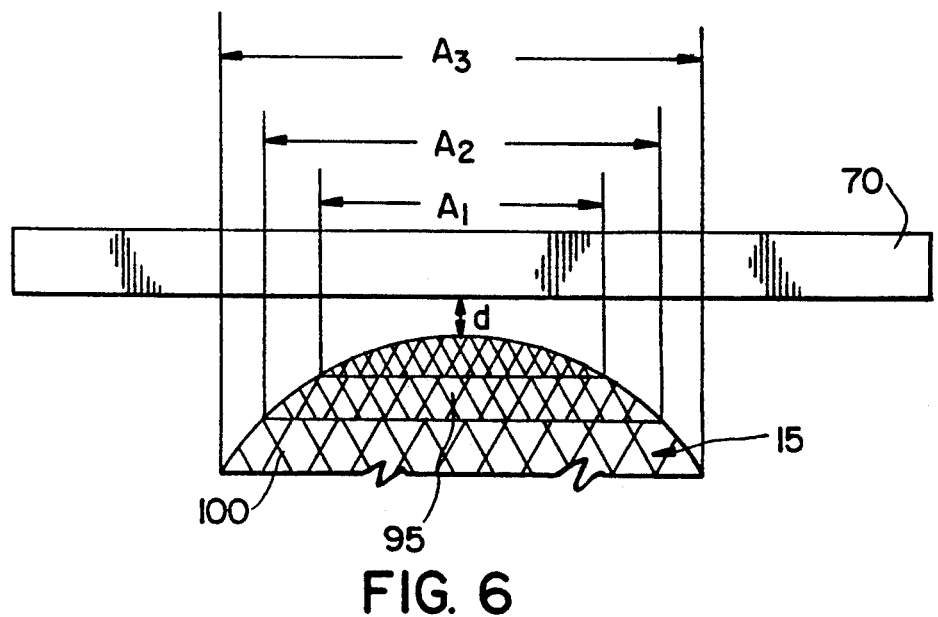
FIG. 6 illustrates the increase in effective capacitive plate area as the probe of FIG. 1 is brought close to a target.
Figure 5A:
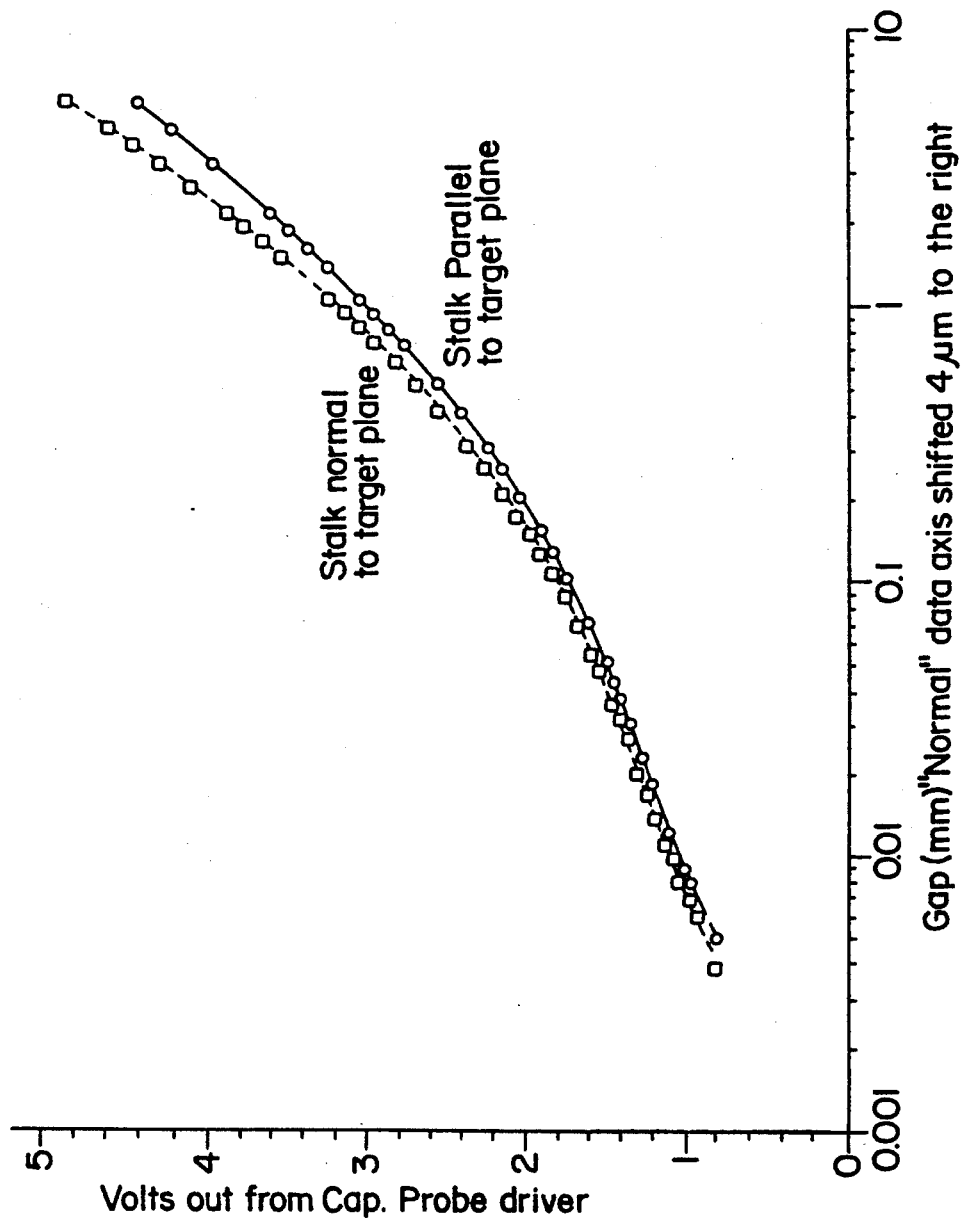
FIG. 5A is a graph showing the logarithmic characteristics of the probe at small gap distances.

The graph of FIG. 5A demonstrates the omni-directional characteristics exhibited by the spherical probe tip. These characteristics can be further illustrated with the assistance of FIG. 6. FIG. 6 is a close-up view showing the spherical sensing tip 15 a distance d away from the target plate 70.

When the spherical sensing tip 15 is displaced from the target plate 70 a distance greater than one radius, the capacitance of the spherical probe tip is close to the free space value $4\pi e_0 r$ where r is the radius of the spherical sensing tip in cm and $e_0$ is the dielectric constant in a vacuum.

As the spherical tip 15 approaches the target plate 70 (e.g. workpiece), and the gap d becomes small compared to the sphere radius r, a capacitor is formed by the spherical tip 15 and the target plate 70. The capacitance of this capacitor begins exceeding the free space capacitance of the sensing tip at a gap d of approximately one radius and grows logarithmically with decreasing gap sizes. The capacitance increase results from the balance between the decrease in distance d between the probe section 90 and the target and the decreasing effective contributing plate area of the capacitor, illustrated in FIG. 6 with successive area projections A1, A2, and A3, that results as the successive probe portions 95 and 100 approach the target 70.

Figure 7:
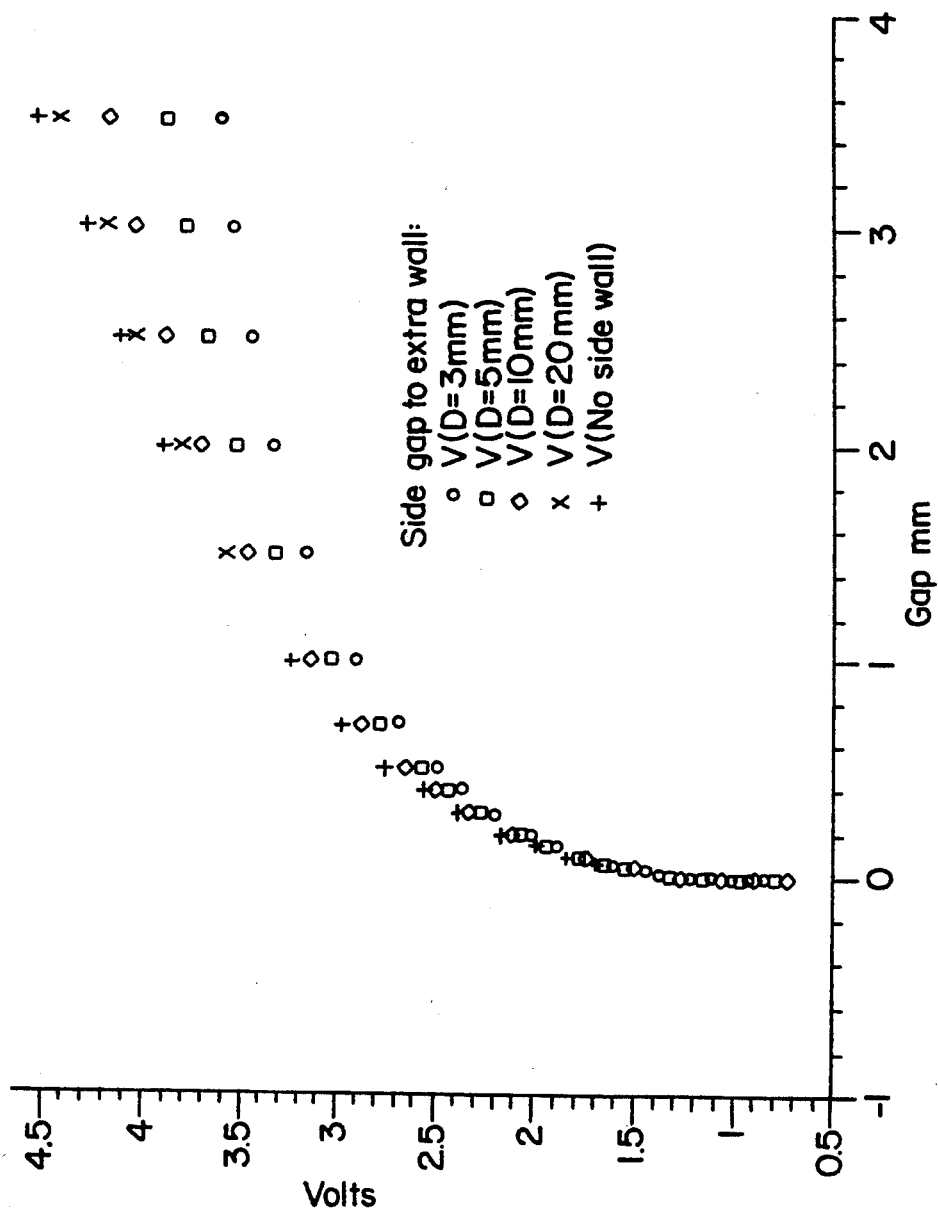
FIG. 7 is a graph showing the effect that an extra sidewall has on probe measurements.

The omnidirectional characteristics of the probe 10 will cause it to respond to the target as well as all nearby conductive objects. The logarithmic response of the probe, however, reduces the effect that these nearby objects have on the capacitance since the capacitance due to the proximity of the probe with the target will, for small gaps, far exceed the capacitance due to the proximity of the probe and the nearby objects. FIG. 7 illustrates this effect and shows a graph of voltage versus gap size in the presence of a sidewall for sidewall gaps of 3, 5, 10 and 20 mm.

The illustrated omnidirectional behavior shown in FIG. 7 affords a simple mechanism to measure the effect of stray capacitance due to nearby objects and to automatically compensate for it. As an example, in a typical measurement sequence under program control, a CMM could move the probe 10 to several sensing gap distances of 1 mm, 0.1 mm, and 0.01 mm. Based on these measurements, the stray capacitance due to, for example, sidewalls, can be extracted and corrected automatically by the CMM.

Figure 8:
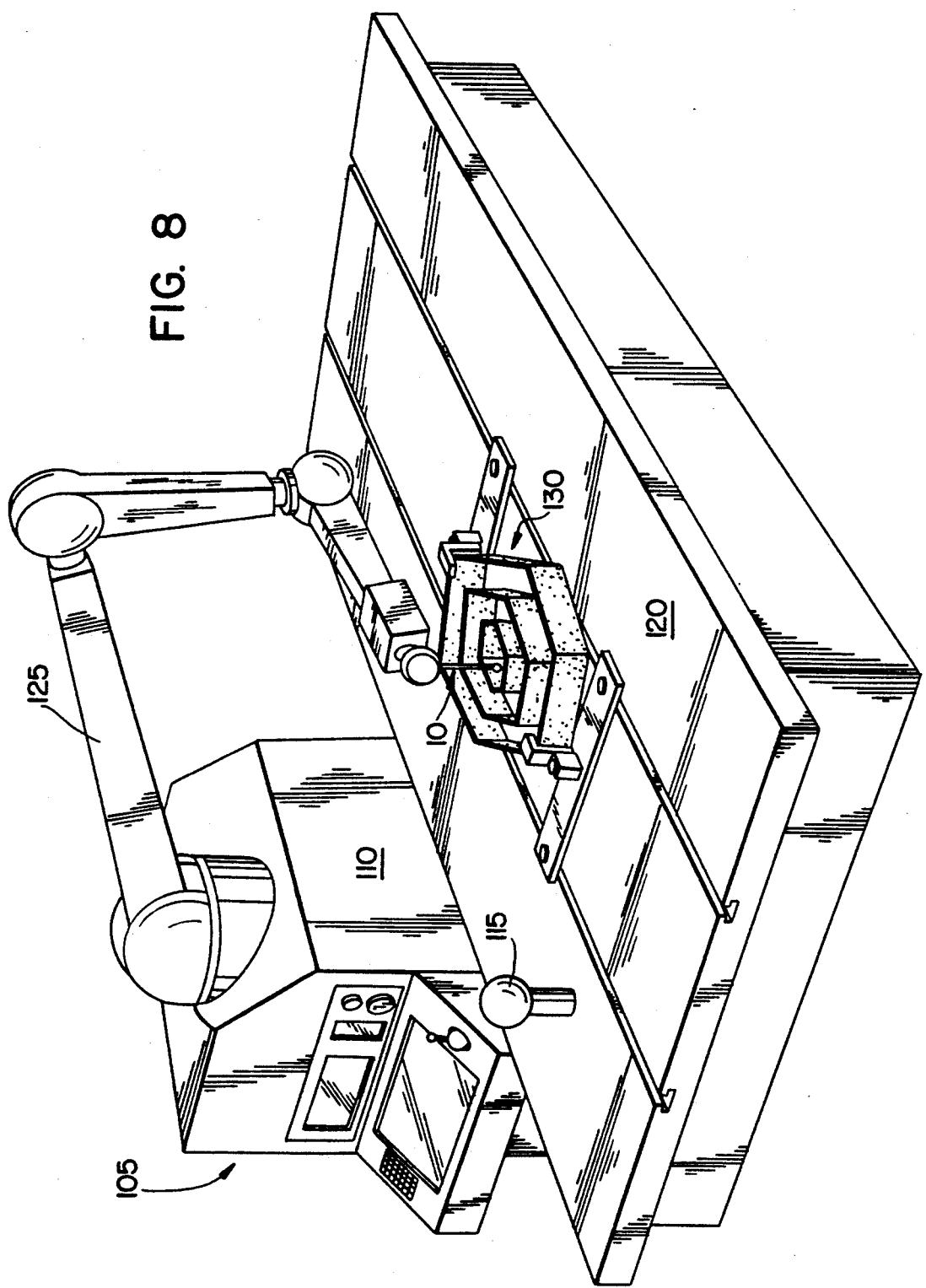
FIG. 8 shows the probe of FIG. 1 incorporated into a CMM.

FIG. 8 shows an exemplary CMM 105 using the probe 10. The CMM 105 includes a control console 110, a calibration sphere 115, a workpiece table 120, and an arm 125 which holds and maneuvers the probe 10 under program control. The table 120 supports a workpiece 130, here shown as a silicon structure used in high energy physics applications. The arm 125 guides the probe 10 along the workpiece 130 to conduct the required measurements. Although the probe is shown with respect to one type of CMM, it will be recognized that the probe is suitable for use with numerous other CMMs, such as a Cordax 1800, or one of the CMM types shown in ANSI/ASME B89.1.12M-1985, incorporated herein by reference.

The probe 10 can be used to replace a contact switch probe normally used in such a CMM. To accomplish this, an interface box (not shown) can provide a short or open circuit signal that would otherwise be produced by a switch closure in the contact probe. This short or open circuit signal to the CMM would occur when the voltage output from the capacitive probe driver 80 (not shown in FIG. 8) indicates that the spherical tip 15 is a fixed distance away from workpiece, for example, when the gap therebetween is approximately 1 $\mu$m.

While the invention has been described hereinabove with respect to several embodiments, those of ordinary skill in the art will recognize that the embodiments may be modified and altered without departing from the central spirit and scope of the invention. Thus, the preferred embodiments described hereinabove are to be considered in all respects as illustrative and not restrictive, the scope of the invention being indicated by the appended claims rather than by the foregoing description. Therefore, it is the intention of the inventor to embrace herein all changes which come within the meaning and range of equivalency of the claims.

I claim:

1. An omnidirectional capacitive probe comprising:
   an electrically conductive hollow stalk;
   an electrically conductive spherical sensing tip disposed at one end of said hollow stalk, said spherical sensing tip formed as a substantially complete sphere;
   a wire coaxially disposed within said hollow stalk and electrically connected to said spherical sensing tip;
   a first voltage generating means for generating a first A.C. voltage between said spherical sensing tip and a workpiece; and
   a second voltage generating means for generating a second A.C. voltage between said hollow stalk and said workpiece, said first and second voltages being generally equal in phase and magnitude thereby to reduce the effect of stray capacitance on measurements made with said capacitive probe;
   said spherical sensing tip forming a capacitor with said workpiece when said spherical sensing tip is located in close proximity with the workpiece, the capacitor formed by said spherical sensing tip and the workpiece having a capacitance that is indicative of the distance between said spherical sensing tip and the workpiece, the capacitance of the capacitor formed by said spherical sensing tip and said workpiece being generally independent of the orientation of the spherical sensing tip with respect to the workpiece at distances less than the radius of said spherical tip.

2. An omnidirectional capacitive probe comprising:
   an electrically conductive hollow stalk;
   an electrically conductive spherical sensing tip disposed at one end of said hollow stalk, said spherical sensing tip formed as a substantially complete sphere;
   means for connecting said spherical sensing tip with said hollow stalk, said means for connecting electrically insulating said spherical sensing tip from said hollow stalk;
   a wire coaxially disposed within said conductive hollow stalk and electrically connected to said electrically conductive spherical sensing tip;
   first voltage generating means for generating a first A.C. voltage between said spherical sensing tip and a target workpiece; and
   second voltage generating means for generating a second A.C. voltage between said hollow stalk and said target workpiece, said first and second voltages being generally equal in phase and magnitude thereby to reduce the effect of stray capacitance on measurements made with said capacitive probe;
   said spherical sensing tip forming a capacitor with said target workpiece when said spherical sensing tip is located in close proximity with the workpiece, the capacitor formed by said spherical sensing tip and the workpiece having a capacitance that is indicative of the distance between said spherical sensing tip and the workpiece, the capacitance of the capacitor formed by said spherical sensing tip and said workpiece being generally independent of the orientation of the spherical sensing tip with the workpiece at distances less than the radius of said spherical tip.

3. An omnidirectional capacitive probe as claimed in claim 2 wherein said spherical sensing tip comprises:
   a center portion formed from an insulating material; and
   an electrically conductive outer shell disposed over said center portion.

4. An omnidirectional capacitive probe as claimed in claim 3 wherein said center portion is made from a ceramic material.

5. An omnidirectional capacitive probe as claimed in claim 2 wherein said spherical sensing tip is formed from a material selected from the group consisting of steel, tungsten carbide, and Inconel.

6. An omnidirectional capacitive probe as claimed in claim 2 wherein said hollow stalk is formed from brass.

* * * * *

UNITED STATES PATENT AND TRADEMARK OFFICE
CERTIFICATE OF CORRECTION

PATENT NO. : 5,315,259
DATED : May 24, 1994
INVENTOR(S) : Hans Jostlein

It is certified that error appears in the above-indentified patent and that said Letters Patent is hereby corrected as shown below:

Title page, Item [54]: Title "GAUGE OF" should read ---GAUGING---
Column 1, line 2, in the title, "GAUGE OF" should read ---GAUGING---
Column 4, line 25, "ga" should read ---gap---.

Signed and Sealed this

Thirteenth Day of September, 1994

BRUCE LEHMAN

*Attest:*

*Attesting Officer*  *Commissioner of Patents and Trademarks*